(12) United States Patent  
Jiang et al.

(10) Patent No.: US 11,551,025 B2  
(45) Date of Patent: Jan. 10, 2023

(54) GENEALOGY ITEM RANKING AND RECOMMENDATION

(71) Applicant: Ancestry.com Operations Inc., Lehi, UT (US)

(72) Inventors: Peng Jiang, Lehi, UT (US); Tyler Folkman, Lehi, UT (US); Tsung-Nan Liu, Lehi, UT (US); Yen-Yun Yu, Lehi, UT (US); Ruhan Wang, Lehi, UT (US); Jack Reese, Lindon, UT (US); Azadeh Moghtaderi, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 917 days.

(21) Appl. No.: 16/406,891

(22) Filed: May 8, 2019

(65) Prior Publication Data

US 2019/0347511 A1    Nov. 14, 2019

Related U.S. Application Data

(60) Provisional application No. 62/668,795, filed on May 8, 2018, provisional application No. 62/668,269, filed on May 8, 2018.

(51) Int. Cl.  
*G06F 16/00* (2019.01)  
*G06K 9/62* (2022.01)  
(Continued)

(52) U.S. Cl.  
CPC ......... *G06K 9/623* (2013.01); *G06F 16/9027* (2019.01); *G06K 9/6257* (2013.01); *G06K 9/6263* (2013.01); *G06N 20/00* (2019.01)

(58) Field of Classification Search  
CPC .... G06K 9/623; G06K 9/6257; G06K 9/6263; G06F 16/9027; G06F 16/24578; G06N 20/00; G06N 3/0454; G06N 3/08  
See application file for complete search history.

(56) References Cited

U.S. PATENT DOCUMENTS

| | | | |
|---|---|---|---|
| 2006/0123000 A1* | 6/2006 | Baxter | G06F 16/30 |
| | | | 707/999.005 |
| 2008/0228818 A1* | 9/2008 | Kenedy | G06F 16/00 |

(Continued)

OTHER PUBLICATIONS

International Search Report and Written Opinion dated Jul. 22, 2019 in related PCT application No. PCT/US2019/031351, 7 pgs.

(Continued)

*Primary Examiner* — Jared M Bibbee  
(74) *Attorney, Agent, or Firm* — Kilpatrick Townsend & Stockton LLP

(57) ABSTRACT

Systems and methods for training a machine learning (ML) ranking model to rank genealogy hints are described herein. One method includes retrieving a plurality of genealogy hints for a target person, where each of the plurality of genealogy hints corresponds to a genealogy item and has a hint type of a plurality of hint types. The method includes generating, for each of the plurality of genealogy hints, a feature vector having a plurality of feature values, the feature vector being included in a plurality of feature vectors. The method includes extending each of the plurality of feature vectors by at least one additional feature value based on the number of features of one or more other hint types of the plurality of hint types. The method includes training the ML ranking model using the extended plurality of feature vectors and user-provided labels.

20 Claims, 11 Drawing Sheets

(51) Int. Cl.
G06F 16/901 (2019.01)
G06N 20/00 (2019.01)

(56) References Cited

U.S. PATENT DOCUMENTS

2014/0358864 A1* 12/2014 Hale .................. G06F 16/9027
707/667
2017/0213127 A1* 7/2017 Duncan .................. G16B 50/30
2017/0293861 A1 10/2017 Roy et al.

OTHER PUBLICATIONS

European Search Report for 19800342.8 dated Dec. 13, 2021, all pages.
Randall Wilson D., "Beyond probabilistic record linkage: Using neural networks and complex features to improve genealogical record linkage," Neural Networks (IJCNN), The 2011 International Joint Conference On, IEEE, Jul. 31, 2011, pp. 9-14, DOI: 10.1109/IJCNN.2011.6033192 ISBN: 978-1-4244-9635-8 *abstract* *Sections I, IV and VI*.
Eric Malmi et al., "AncestryAI", World Wide Web Companion, International World Wide Web Conferences Steering Committee, Republic and Canton of Geneva Switzerland, Apr. 3, 2017, pp. 257-261, DOI: 10.1145/3041021.3054728 ISBN: 978-1-4503-4914-7 *abstract; figure 1* *Sections I-IV*.

* cited by examiner

GENEALOGY ITEM RANKING AND RECOMMENDATION

CROSS-REFERENCES TO RELATED APPLICATIONS

This application claims priority to U.S. Provisional Patent Application No. 62/668,269, filed May 8, 2018, entitled "LEARNING TO RANK FOR GENEALOGY RESOURCE RECOMMENDATION," and to U.S. Provisional Patent Application No. 62/668,795, filed May 8, 2018, entitled "LEARNING TO RANK FOR GENEALOGY RESOURCE RECOMMENDATION," the entire content of each of which is herein incorporated in its entirety.

BACKGROUND OF THE INVENTION

In certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in maintaining genealogical databases has been entity resolution, which refers to the problem of identifying and linking different manifestations of the same real-world entity. For example, many manifestations of the same person may appear across multiple trees. This problem arises due to discrepancies between different historical records, discrepancies between historical records and human accounts, and discrepancies between different human accounts. For example, different users having a common ancestor may have different opinions as to the name, date of birth, and place of birth of that ancestor. The problem becomes particularly prevalent when large amounts of historical documents are difficult to read, causing a wide range of possible ancestor data.

Another challenge in maintaining genealogical databases relates to providing a robust recommender system with an efficient ranking algorithm to help genealogy enthusiasts find relevant information of their ancestors so as to better discover their family history. While ranking strategies have been applied to recommend and rank items in many applications, no efficient methodology to rank ancestry items currently exists. Accordingly, there is a need for improved techniques in the area.

BRIEF SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a method of training a machine learning (ML) ranking model to rank genealogy hints, the method comprising: retrieving a plurality of genealogy hints for a target person, wherein each of the plurality of genealogy hints corresponds to a genealogy item and has a hint type of a plurality of hint types, wherein each of the plurality of hint types has a number of features; generating, for each of the plurality of genealogy hints, a feature vector having a plurality of feature values, the feature vector being included in a plurality of feature vectors; extending each of the plurality of feature vectors by at least one additional feature value based on the number of features of one or more other hint types of the plurality of hint types; creating a first training set based on the plurality of feature vectors; training the ML ranking model in a first stage using the first training set; creating a second training set including a subset of the plurality of genealogy hints that were incorrectly ranked after the first stage; and training the ML ranking model in a second stage using the second training set.

Example 2 is the method of example(s) 1, wherein the ML ranking model is a neural network.

Example 3 is the method of example(s) 1-2, wherein the plurality of hint types includes one or more of: a record hint type; a photo hint type; or a story hint type.

Example 4 is the method of example(s) 1-3, wherein the number of the plurality of feature values in the feature vector generated for each of the plurality of genealogy hints is equal to the number of features for the hint type.

Example 5 is the method of example(s) 1-4, wherein each of the plurality of feature vectors are extended through zero padding.

Example 6 is the method of example(s) 1-5, further comprising: receiving a user input indicating the target person.

Example 7 is the method of example(s) 1-6, further comprising: receiving a user input providing a ranking label, wherein the second training set is created based on the ranking label.

Example 8 is a non-transitory computer-readable medium comprising instructions that, when executed by one or more processors, cause the one or more processors to perform operations comprising: retrieving a plurality of genealogy hints for a target person, wherein each of the plurality of genealogy hints corresponds to a genealogy item and has a hint type of a plurality of hint types, wherein each of the plurality of hint types has a number of features; generating, for each of the plurality of genealogy hints, a feature vector having a plurality of feature values, the feature vector being included in a plurality of feature vectors; extending each of the plurality of feature vectors by at least one additional feature value based on the number of features of one or more other hint types of the plurality of hint types; creating a first training set based on the plurality of feature vectors; training a machine learning (ML) ranking model in a first stage using the first training set; creating a second training set including a subset of the plurality of genealogy hints that were incorrectly ranked after the first stage; and training the ML ranking model in a second stage using the second training set.

Example 9 is the non-transitory computer-readable medium of example(s) 8, wherein the ML ranking model is a neural network.

Example 10 is the non-transitory computer-readable medium of example(s) 8-9, wherein the plurality of hint types includes one or more of: a record hint type; a photo hint type; or a story hint type.

Example 11 is the non-transitory computer-readable medium of example(s) 8-10, wherein the number of the plurality of feature values in the feature vector generated for each of the plurality of genealogy hints is equal to the number of features for the hint type.

Example 12 is the non-transitory computer-readable medium of example(s) 8-11, wherein each of the plurality of feature vectors are extended through zero padding.

Example 13 is the non-transitory computer-readable medium of example(s) 8-12, wherein the operations further comprise: receiving a user input indicating the target person.

Example 14 is the non-transitory computer-readable medium of example(s) 8-13, wherein the operations further comprise: receiving a user input providing a ranking label, wherein the second training set is created based on the ranking label.

Example 15 is a system comprising: one or more processors; and a non-transitory computer-readable medium comprising instructions that, when executed by the one or more processors, cause the one or more processors to perform operations comprising: retrieving a plurality of genealogy hints for a target person, wherein each of the plurality of genealogy hints corresponds to a genealogy item and has a hint type of a plurality of hint types, wherein each of the plurality of hint types has a number of features; generating, for each of the plurality of genealogy hints, a feature vector having a plurality of feature values, the feature vector being included in a plurality of feature vectors; extending each of the plurality of feature vectors by at least one additional feature value based on the number of features of one or more other hint types of the plurality of hint types; creating a first training set based on the plurality of feature vectors; training a machine learning (ML) ranking model in a first stage using the first training set; creating a second training set including a subset of the plurality of genealogy hints that were incorrectly ranked after the first stage; and training the ML ranking model in a second stage using the second training set.

Example 16 is the system of example(s) 15, wherein the ML ranking model is a neural network.

Example 17 is the system of example(s) 15-16, wherein the plurality of hint types includes one or more of: a record hint type; a photo hint type; or a story hint type.

Example 18 is the system of example(s) 15-17, wherein the number of the plurality of feature values in the feature vector generated for each of the plurality of genealogy hints is equal to the number of features for the hint type.

Example 19 is the system of example(s) 15-18, wherein each of the plurality of feature vectors are extended through zero padding.

Example 20 is the system of example(s) 15-19, wherein the operations further comprise: receiving a user input indicating the target person.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
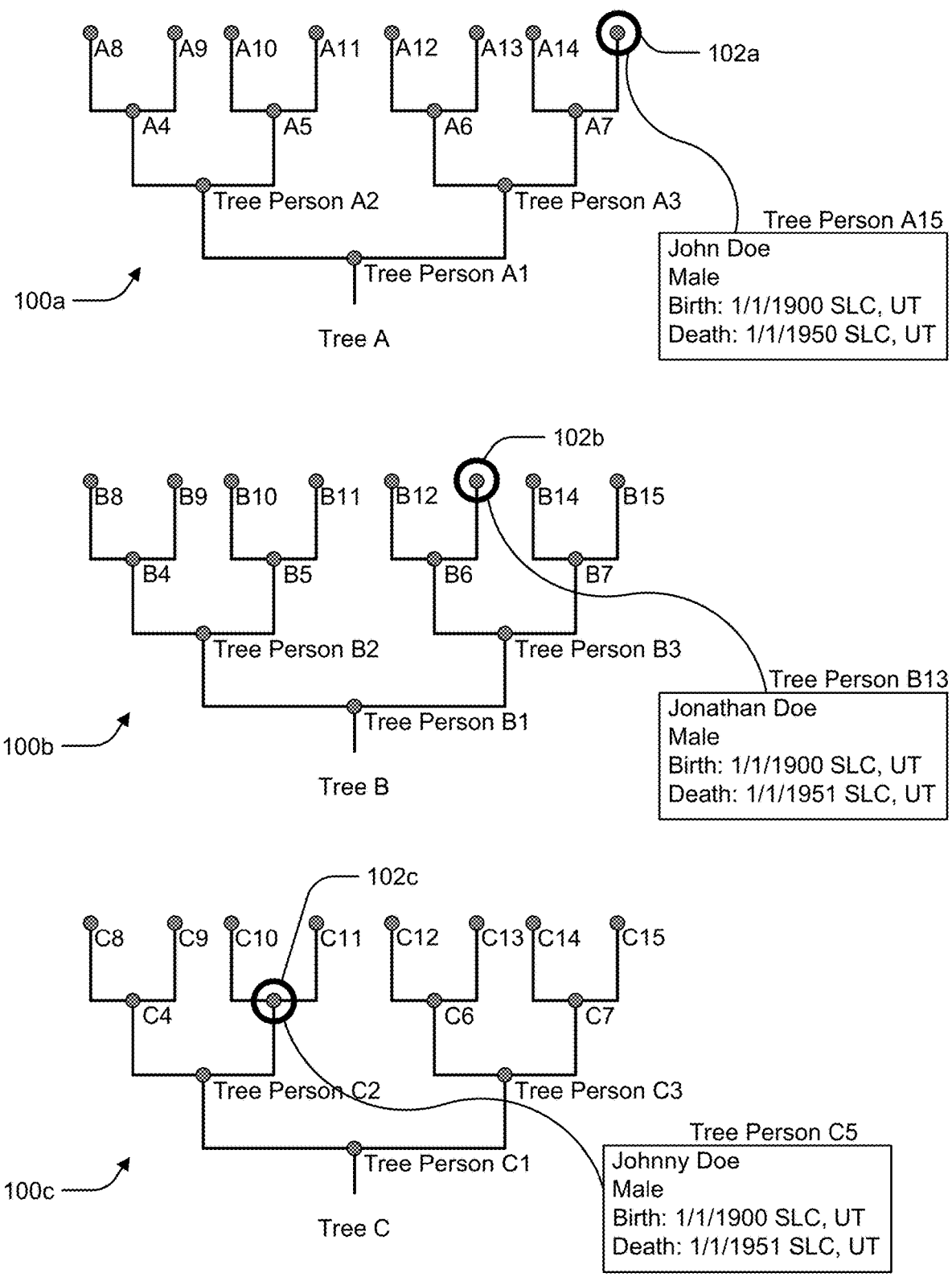
FIG. 1 illustrates various trees having similar individuals, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present invention provide for systems, methods, and other techniques for ranking genealogy items for a user. Techniques described herein allow various types of information to be ranked, including family history records, photos, and stories. Types of family history records can include birth records, marriage records, immigration records, etc. As there exists huge amounts of genealogy item of various types, recommending relevant information and prioritizing items in a preferred order is helpful for genealogy enthusiasts in the journey of discovering their family history, since a robust recommender system and an efficient ranking algorithm could greatly save time while improving user experience.

To effectively recommend the best genealogy items from billions of potential items, the scope of the data is limited via entity resolution, which includes identifying and linking different manifestations of the same real-world entity. The data can consist of many genealogical trees and records. The trees often have nodes that overlap with each other, creating duplicate entities. Additionally, various records can exist that refer to the same entity while varying in their content. For example, a birth record for an individual includes birth information while a marriage record includes marriage information. Furthermore, since the tree data can be user generated and the records are mostly keyed from historical records, typos and errors are possible that can add noise to the data.

In order to resolve which records and tree nodes refer to which real-world entities, the problem is reduced to a pairwise classification problem where the classes are "Match" or "Non-Match". There are many criteria to consider when establishing what constitutes a match. Previously studied methodologies include techniques such as exact match, distance match, and TF/IDF matching for text data. A novel approach is employed herein that attempts to replicate the matching criteria of a genealogist and uses a machine learning (ML) algorithm to combine all these criteria into a prediction score. The approach employs a hierarchical classification algorithm which leverages the familial structure of genealogical records. The model trains on thousands of pairwise entity comparisons labeled by professional genealogists to determine whether two records or tree nodes refer to the same entity. This approach provides significant improvements over previous rule-based approaches used for entity recognition. The data also includes content attached by users such as photos and stories. The attached content is also associated with the resolved entity and thus becomes available as a relevant genealogy resource for that entity.

Once the relevant records are associated together with photos and stories, a ranking methodology is employed to appropriately rank them for users. Each item in the recommendation list is referred to as a "hint". Each hint may be labeled by users with one of three actions: accept, reject, or maybe. This may be the relevance score of each item, constituting labels in the training data that the ML ranking model can make use of.

Given the set of thousands of labeled compares from professional genealogists, the information a genealogist would use is encoded in a manner suitable for a ML algorithm. For example, information on name similarity, name uniqueness, and historically common migration patterns. In addition, for some compares, information on other members of the family such as spouse, mother, and children is used. This allows the extent to which the family structure matches to be analyzed. In some embodiments of the present invention, the mother, father, spouse, and three children are considered for each compare.

For each family member comparison, around 50 features from each pair are extracted (for example, mothers are compared to mothers, fathers to fathers, etc.). These features include information on names, births, deaths, and other information from the compare. In addition to these features, family level features are extracted which encompass data from all members of the family. For example, the extent to which the locations and times of events match across both families is analyzed.

The entity resolution algorithm implements a two-step learning process. First, the model is trained using only features from the person of interest—excluding family relations. Once trained, this model allows the strength of comparisons between family members to be evaluated. For example, given a comparison between two persons, this model can be used to determine how well their mothers match. Once this model has extracted the most similar relations for mothers, fathers, spouses, and 3 children, the features from all these relations can be extracted. This results in close to 400 features including the actual probabilities returned from the first model on the closeness of the family relations. Another model is then trained using this extended feature set. This model can be referred to as the family model because it leverages information from the family relations of the entities.

The entity resolution algorithm described above is used to identify relevant genealogy items for the ML ranking algorithm. One goal of the ML ranking algorithm is to provide an optimal ranking for a list of items based on the descending order of the item score. The item scoring function can be defined on weights that indicate the contribution of features to the ranking function. Labels are the ground truth relevance scores of items. Label quality is important to ranking performance, as optimal weights of features in the ranking function are learned from training data so that the ranking function generates high scores for items with high relevance scores.

Relevance scores can be obtained from explicit or implicit feedback from users. Explicit feedback requires cognitive effort to collect people's direct feedback. The alternative is implicit feedback which is abundant and easy to collect. Implicit feedback is domain dependent, varying from play times of a track in music recommendation system, time spent reading a page in web search, and click times of a product in E-Commerce search. The challenge when using implicit feedback is how to use it in a reasonable way. Implicit feedback is incorporated herein by each hint being given one of three actions by genealogy enthusiasts: accept, reject, or maybe. The explicit feedback generates three different levels of relevance scores for each hint. Some embodiments of the present invention use 3, 2, and 1 to indicate accepted, maybe, and rejected hints respectively. This generates labels in the training data.

Features are defined on each of the pairs between a target person and a hint. First, available information from a target person is extracted, such as the first name, last name, birth place, etc. Next, features are defined between the target person and each hint from each hint type, including record hints, photo hints, and story hints. Two different types of features are defined: record-specific features and relevance features. Information from records are extracted to calculate record-specific features by determining whether certain fields exist in both the target person and the hint.

To facilitate the ranking of digitized genealogy photos, image feature extraction is accomplished using deep learning convolutional neural networks to classify a photo into a unique category. By using categories as features for photos, certain categories can be found to be more valuable than others, and the ML ranking model can learn the weights associated with each category. In one implementation, GoogleNet was selected as the network architecture, and the model was trained using approximately 50,000 labeled training images for 30 epochs. The model training plateaued at 97.8% accuracy after the 20th epoch. All images were converted to color 256×256 format, and mean image subtraction was used. The model was trained to recognize 70 classes of content comprised of images containing photos, documents, headstones, coat-of-arms, flags, etc.

Story hints are valuable because personal stories one user contributes and uploads could be richly rewarding information for others. Feature vectors are generated for stories by calculating the similarities between the stories and the corresponding target persons. Specifically, the facts regarding a target person (e.g., name, birth, death, etc.) are compared to keywords extracted from stories. Then a string similarity metric (e.g., Jaro-Winkler distance) may be used for measuring the distance between the two sequences. Feature vectors for story hints may also be generated using a neural network, which may be trained using user-provided labels, as described herein. Accordingly, in some embodiments, item-specific features are defined for records and photos and relevance-based features are defined for records and stories.

FIG. 1 illustrates three separate trees 100*a-c*, each containing a similar individual 102*a-c*, respectively. Trees 100*a-c* are also denoted as Trees A, B, and C, respectively. Trees A, B, and C may be owned by, created by, and/or used by Tree Persons A1, B1, and C1, or by other users unrelated to persons in Trees A, B, and C. In some embodiments, it may be determined that Tree Person A15 (named "John Doe"), Tree Person B13 (named "Jonathan Doe"), and Tree Person C5 (named "Johnny Doe") correspond to the same real-life individual based on their similarity. Although a user of Tree A may understand Tree Person A15 to be John Doe, it may be beneficial to that user to become aware of the information discovered by the users of Trees B and C, who understand John Doe to have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to identify, group, and possibly merge together tree persons that are determined to correspond to the same real-life individual.

One method for determining whether Tree Persons A15, B13, and C5 correspond to the same real-life individual is a rule-based algorithm in which a human expert looks at different pairs of persons and creates rules. For example, consider that two persons are named "Jack Smith" but one is born in Mar. 1, 1981 and the other is born in Mar. 1, 1932. A rule-based algorithm may generate four separate scores, one for a comparison of the names (a high score in this example), one for a comparison of the month of birth (a high score in this example), one for a comparison of the day of birth (a high score in this example), and one for the year of birth (a low score in this example). The four separate scores are added together to generate a final similarity score. The higher the similarity score, the higher the probability that the two tree persons correspond to the same real-life individual.

There are several disadvantages to rule-based algorithms. First, they are subjective. When scores are combined into a final similarity score, they may be weighted such that the final similarity score is overly sensitive to the chosen weighting, which may be arbitrary. Second, rule-based algorithms become extremely complicated as they must account for several special cases, such as popular names. Third, rule-based algorithms are difficult to update and maintain. Over time, there may be hundreds of rules to generate a single final similarity score. If new special cases arise, a human expert has to verify whether all the previously generated rules will apply to the new case or not. If a particular rule does not apply, then a change may be needed.

Accordingly, in some embodiments, a ML model is used to perform entity resolution to determine that Tree Persons A15, B13, and C5 correspond to the same real-life individual.

Figure 2:
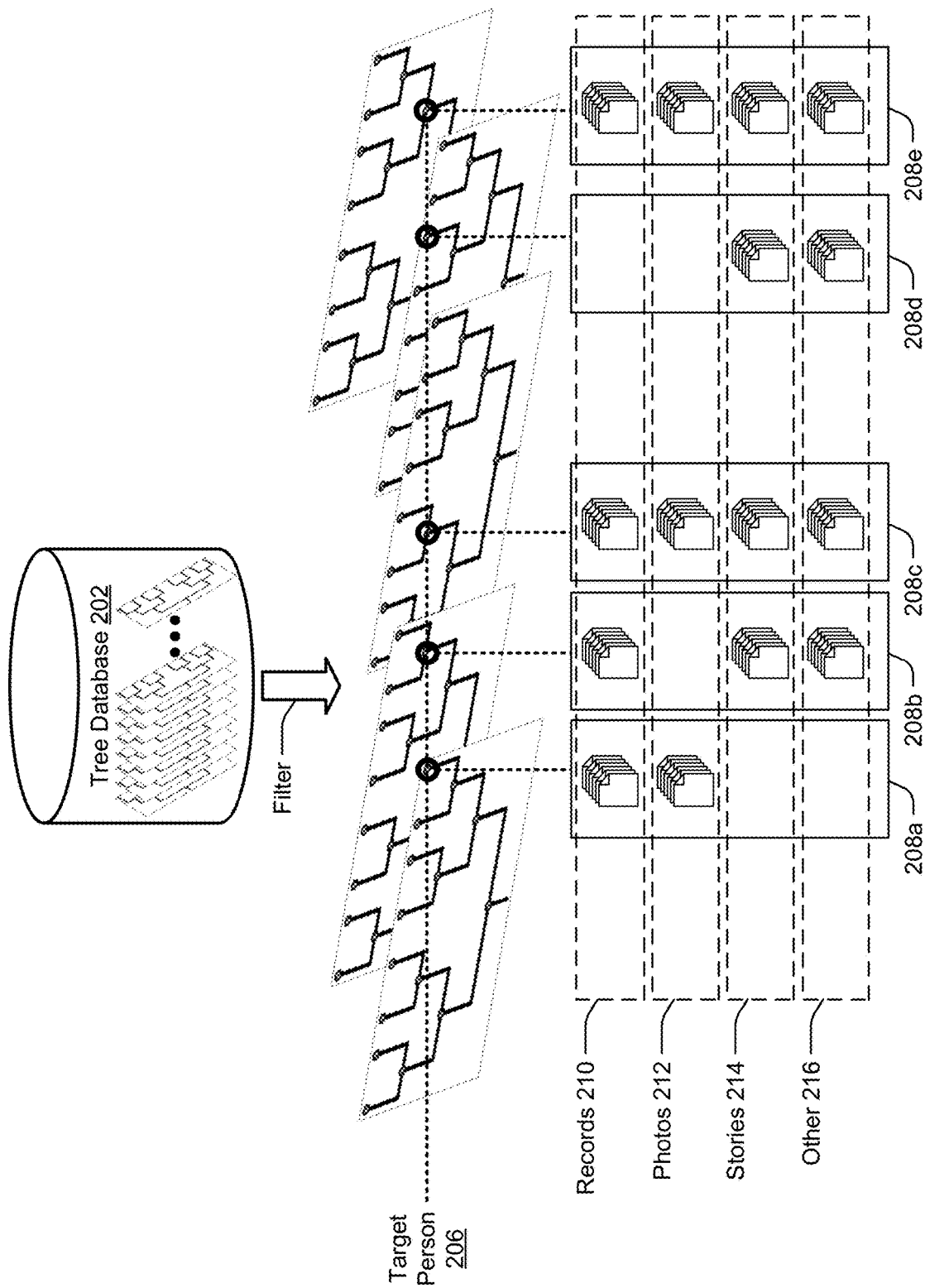
FIG. 2 illustrates a filtering step to retrieve genealogy items for a target person, according to some embodiments of the present invention.

FIG. 2 illustrates a filtering step to retrieve genealogy items for a target person, according to some embodiments of the present invention. An entity or target person 206 is selected form a set of entities or target persons. Tree database 202 is scanned to retrieve trees containing the target person as well as the genealogy items associated with the target person. In the illustrated example, 5 trees are retrieved from tree database 202 that contain target person 206. For each of the trees, genealogy items 208 associated with the target person are also retrieved. Genealogy items 208 may have various types, including records 210, photos 212, stories 214, and other items 216.

Figure 3:
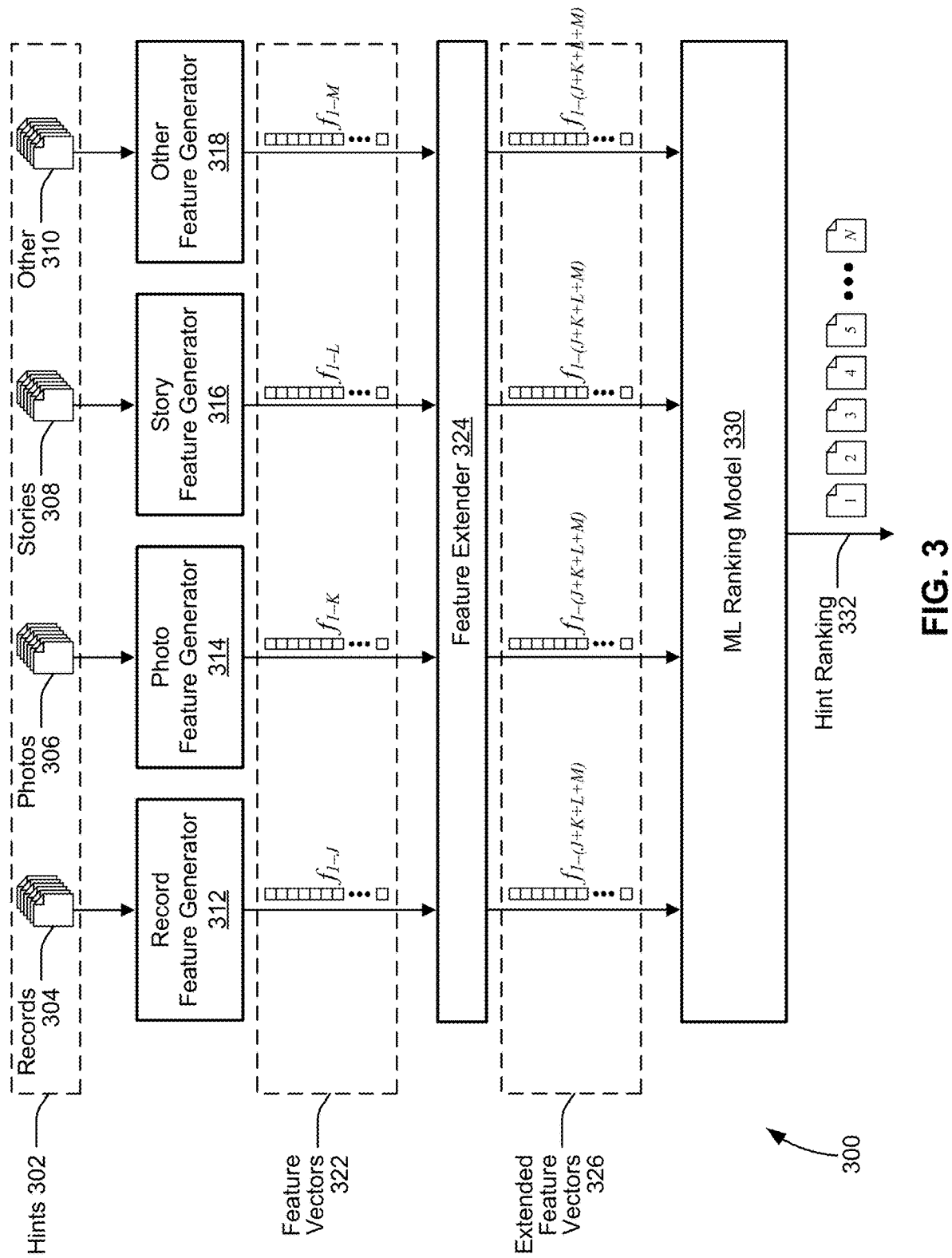
FIG. 3 illustrates a genealogy item ranking system, according to some embodiments of the present invention.

FIG. 3 illustrates a genealogy item ranking system 300, according to some embodiments of the present invention. In some embodiments, genealogy item ranking system 300 receives hints 302 of four hint types: record hints, photo hints, story hints, and other hints. For example, hints 302 may include record hints 304, photo hints 306, story hints 308, and other hints 310. Each of hints 302 may correspond to a genealogy item stored in a database. For example, each of record hints 304 may correspond to a record, each of photo hints 306 may correspond to a photo, and each of story hints 308 may correspond to a story. In some embodiments, each of other hints 310 may correspond to related audio or video information.

In some embodiments, genealogy item ranking system 300 includes a record feature generator 312 that generates a feature vector $F_{1-J}$ for each of record hints 304. Feature vector $f_{1-J}$ may include J feature values, where J is the number of features for the record hint type. In some embodiments, each feature value of feature vector $f_{1-J}$ indicates whether a particular feature is found in the corresponding record (e.g., birth date, marriage date, etc.). In some embodiments, record feature generator 312 comprises a ML model, such as a neural network.

In some embodiments, genealogy item ranking system 300 includes a photo feature generator 314 that generates a feature vector $f_{1-K}$ for each of photo hints 306. Feature vector $f_{1-K}$ may include K feature values, where K is the number of features for the photo hint type. In some embodiments, each feature value of feature vector $f_{1-K}$ indicates whether a particular feature is found in the corresponding photo (e.g., people, landscape, etc.). In some embodiments, photo feature generator 314 comprises a ML model, such as a neural network.

In some embodiments, genealogy item ranking system 300 includes a story feature generator 316 that generates a feature vector $f_{1-L}$ for each of story hints 308. Feature vector $f_{1-L}$ may include L feature values, where L is the number of features for the story hint type. In some embodiments, each feature value of feature vector $f_{1-L}$ indicates whether a particular feature is found in the corresponding story (e.g., name, birth date, etc.). In some embodiments, story feature generator 316 comprises a ML model, such as a neural network.

In some embodiments, genealogy item ranking system 300 includes another feature generator 318 that generates a feature vector $f_{1-M}$ for each of other hints 310. Feature vector $f_{1-M}$ may include M feature values, where M is the number of features for the other hint type. In some embodiments, each feature value of feature vector $f_{1-M}$ indicates whether a particular feature is found in the corresponding other item. In some embodiments, other feature generator 318 comprises a ML model, such as a neural network.

In some embodiments, feature vectors 322 are extended by a feature extender 324, thereby generating extended feature vectors 326. In some embodiments, feature extender 324 adds at least one additional feature value to each of feature vectors 322. In some embodiments, all extended feature vectors 326 are normalized to have the same length (i.e., same number of feature values). In some embodiments, all extended feature vectors 326 are normalized to have the same value range (e.g., between 0 and 1) for all feature values. The number of feature values that is added to a particular feature vector is based on the hint type of the particular feature vector. Specifically, the number of added features is the cumulative number of feature values of the other hint types. Several examples are described below.

For a particular feature vector of feature vectors 322 that corresponds to one of record hints 304, the number of feature values in the particular feature vector is J. The number of feature values that are added to the particular feature vector is the sum of the number of feature values for the other three hint types: K for photo hints 306, L for story hints 308, and M for other hints 310. Accordingly, K+L+M feature values are added (e.g., appended to the beginning and/or end) to the particular feature vector by feature extender 324 to generate an extended feature vector having J+K+L+M feature values.

Similarly, for a particular feature vector of feature vectors 322 that corresponds to one of photo hints 306, the number of feature values in the particular feature vector is K. The number of feature values that are added to the particular feature vector is the sum of the number of feature values for the other three hint types: J for record hints 304, L for story hints 308, and M for other hints 310. Accordingly, J+L+M feature values are added (e.g., appended to the beginning and/or end) to the particular feature vector by feature extender 324 to generate an extended feature vector having J+K+L+M feature values.

Similarly, for a particular feature vector of feature vectors 322 that corresponds to one of story hints 308, the number of feature values in the particular feature vector is L. The number of feature values that are added to the particular feature vector is the sum of the number of feature values for the other three hint types: J for record hints 304, K for photo hints 306, and M for other hints 310. Accordingly, J+K+M feature values are added (e.g., appended to the beginning and/or end) to the particular feature vector by feature extender 324 to generate an extended feature vector having J+K+L+M feature values.

Similarly, for a particular feature vector of feature vectors 322 that corresponds to one of other hints 310, the number of feature values in the particular feature vector is M. The number of feature values that are added to the particular feature vector is the sum of the number of feature values for the other three hint types: J for record hints 304, K for photo hints 306, and L for story hints 308. Accordingly, J+K+L feature values are added (e.g., appended to the beginning and/or end) to the particular feature vector by feature extender 324 to generate an extended feature vector having J+K+L+M feature values.

In some embodiments, genealogy item ranking system 300 includes a ML ranking model 330 for ranking hints 302 based on their corresponding extended feature vectors 326. In some embodiments, ML ranking model 330 receives N extended feature vectors 326 as input and outputs a ranking (e.g., 1 through N) corresponding to the N extended feature vectors 326 and the corresponding N hints 302. Alternatively, ML ranking model 330 may be configured to only output a subset of the N hints, such as the top 5 or top 10 ranked hints.

Figure 4:
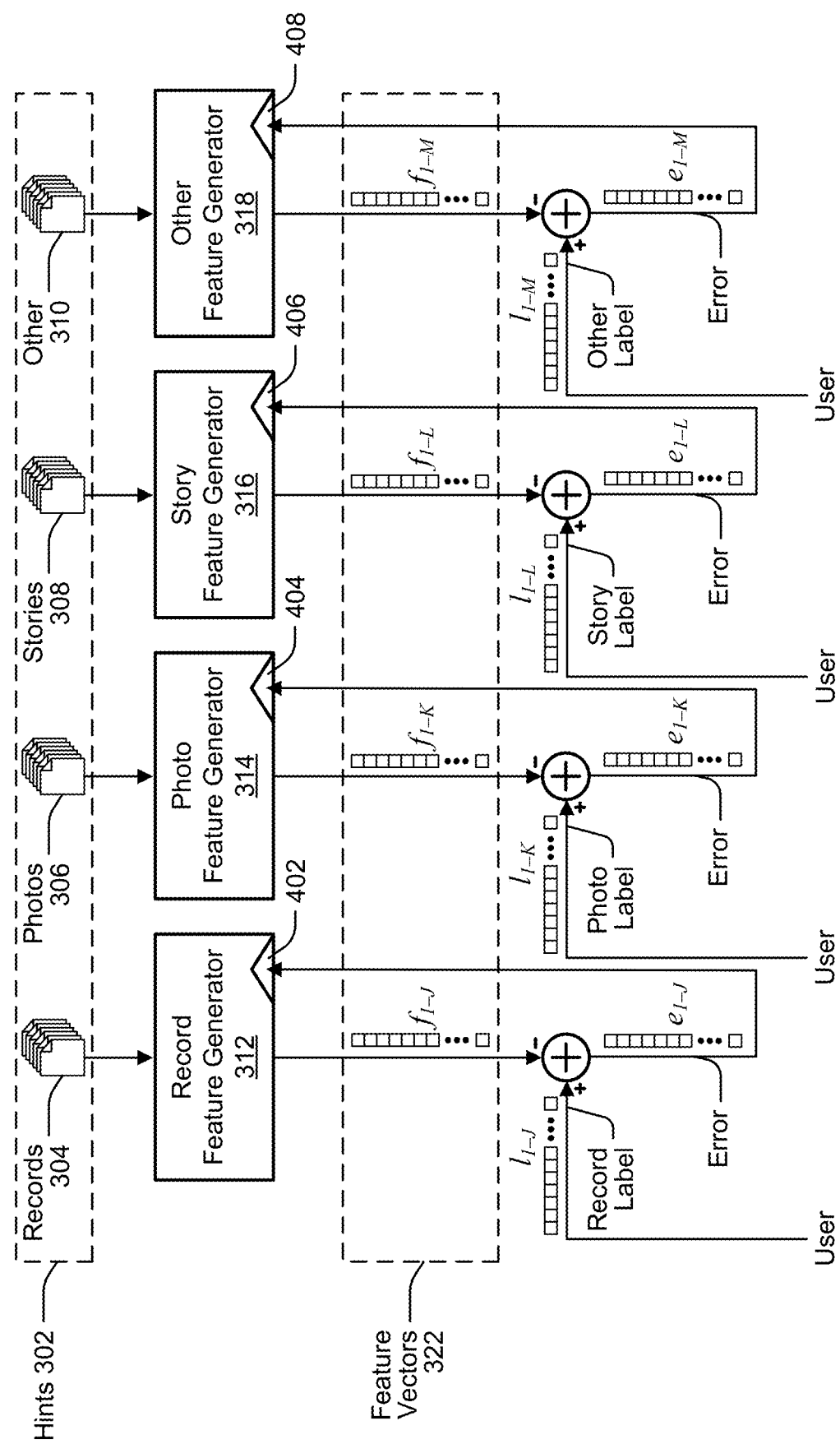
FIG. 4 illustrates a method of training one or more feature generators of a genealogy item ranking system, according to some embodiments of the present invention.

FIG. 4 illustrates a method of training one or more feature generators of a genealogy item ranking system, such as genealogy item ranking system 300, according to some embodiments of the present invention. One or more of feature generators 312, 314, 316, 318 may be trained using user-provided labels as follows.

When record feature generator 312 is implemented as a ML model, such as a neural network, it may be trained by inputting a record hint 304 to record feature generator 312, which outputs feature vector $f_{1-J}$. A user then examines the record hint to create a record label $l_{1-J}$. For example, the user may examine the corresponding record and determine whether each particular feature is found in the record. The user may enter the created label through a computer interface. An error vector $e_{1-J}$ may be calculated as the difference between feature vector $f_{1-J}$ and record label $l_{1-J}$. The ML model is then modified by a modifier 402 based on error vector $e_{1-J}$. Modifier 402 may change weights associated with record feature generator 312 such that feature vector $f_{1-J}$ better approximates record label $l_{1-J}$, causing error vector $e_{1-J}$ to be reduced. This process is repeated for multiple record hints 304 to train record feature generator 312.

Similarly, when photo feature generator 314 is implemented as a ML model, such as a neural network, it may be trained by inputting a photo hint 306 to photo feature generator 314, which outputs feature vector $f_{1-K}$. A user then examines the photo hint to create a photo label $l_{1-K}$. For example, the user may examine the corresponding photo and determine whether each particular feature is found in the photo. The user may enter the created label through a computer interface. An error vector $e_{1-K}$ may be calculated as the difference between feature vector $f_{1-K}$ and record label $l_{1-K}$. The ML model is then modified by a modifier 404 based on error vector $e_{1-K}$. Modifier 404 may change weights associated with photo feature generator 314 such that feature vector $f_{1-K}$ better approximates record label $l_{1-K}$, causing error vector $e_{1-K}$ (to be reduced. This process is repeated for multiple photo hints 306 to train photo feature generator 314.

Similarly, when story feature generator 316 is implemented as a ML model, such as a neural network, it may be trained by inputting a story hint 308 to story feature generator 316, which outputs feature vector $f_{1-L}$. A user then examines the story hint to create a story label $l_{1-L}$. For example, the user may examine the corresponding story and determine whether each particular feature is found in the story. The user may enter the created label through a computer interface. An error vector $e_{1-L}$ may be calculated as the difference between feature vector $f_{1-L}$ and record label $l_{1-L}$. The ML model is then modified by a modifier 406 based on error vector $e_{1-L}$. Modifier 406 may change weights associated with story feature generator 316 such that feature vector $f_{1-L}$ better approximates record label $l_{1-L}$, causing error vector $e_{1-L}$ to be reduced. This process is repeated for multiple story hints 308 to train story feature generator 316.

Similarly, when other feature generator 318 is implemented as a ML model, such as a neural network, it may be trained by inputting another hint 310 to other feature generator 318, which outputs feature vector $f_{1-M}$. A user then examines the other hint to create another label $l_{1-M}$. The user may enter the created label through a computer interface. An error vector $e_{1-M}$ may be calculated as the difference between feature vector $f_{1-M}$ and record label $l_{1-M}$. The ML model is then modified by a modifier 408 based on error vector $e_{1-M}$. Modifier 408 may change weights associated with other feature generator 318 such that feature vector $f_{1-M}$ better approximates record label $l_{1-M}$, causing error vector $e_{1-M}$ to be reduced. This process is repeated for multiple other hints 310 to train other feature generator 318.

Figure 5:
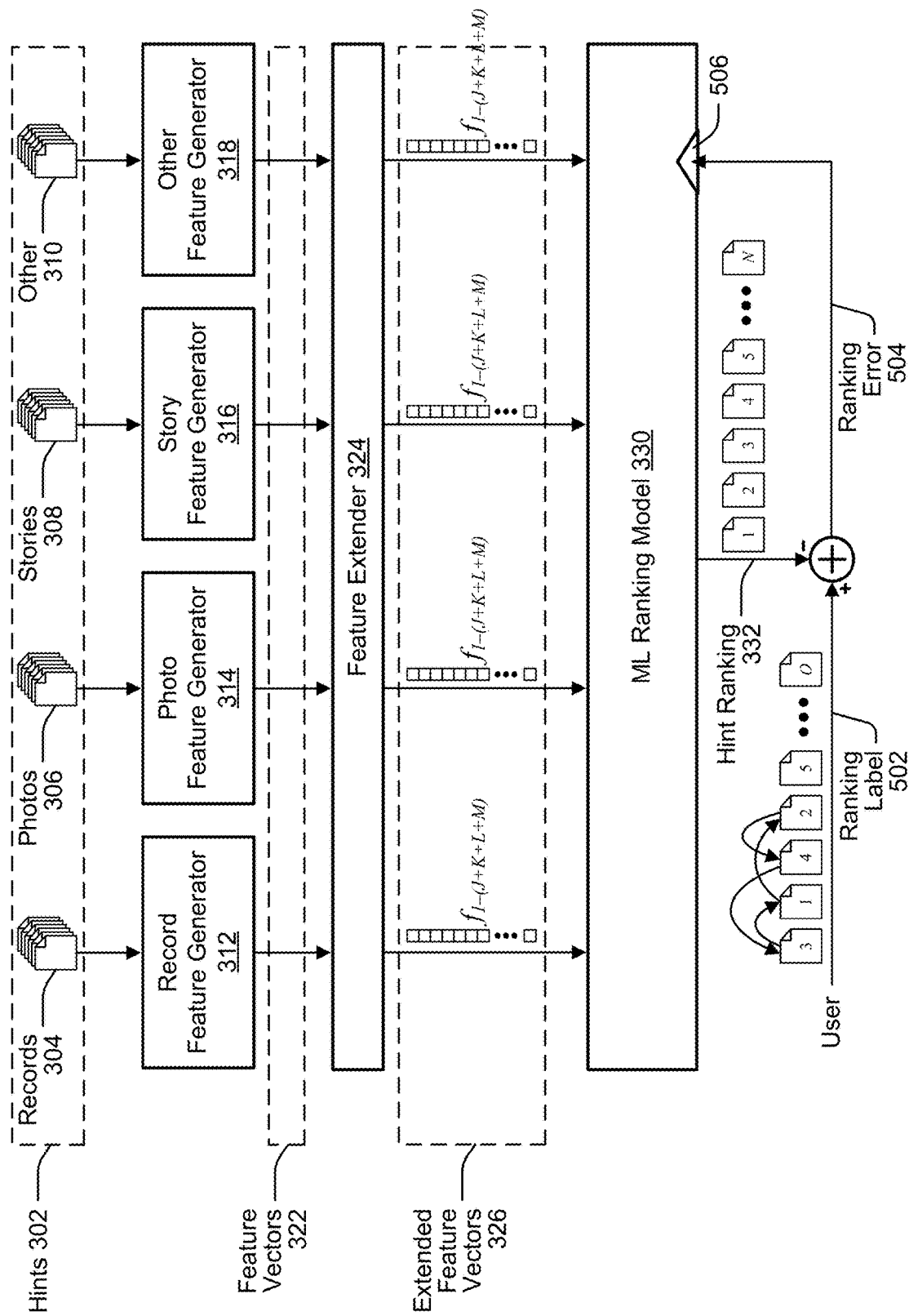
FIG. 5 illustrates a method of training a machine learning ranking model, according to some embodiments of the present invention.

FIG. 5 illustrates a method of training ML ranking model 330, according to some embodiments of the present invention. ML ranking model 330 may be trained after feature generators 312, 314, 316, 318 are trained by inputting one or more of extended feature vectors 326 to ML ranking model 330, which outputs hint ranking 332. A user may examine hint ranking 332 and/or the corresponding hints 302 to create a ranking label 502. Ranking label 502 may provide a complete ranking of the N hints 302, may indicate which hints should be ranked higher or lower, or may indicate which hints the user is not interested in, among other possibilities. A ranking error 504 may be generated based on the difference between ranking label 502 and hint ranking 332.

ML ranking model 330 is then modified by a modifier 506 based on ranking error 504. Modifier 506 may change weights associated with ML ranking model 330 such that hint ranking 332 better approximates ranking label 502, causing ranking error 504 to be reduced. ML ranking model 330 can be trained using different selections of extended feature vectors 326. For example, N extended feature vectors 326 may be randomly selected for each training step. As the accuracy of ML ranking model 330 improves, N may be increased so that the likelihood of more similar extended feature vectors 326 being selected also increases.

Figure 6:
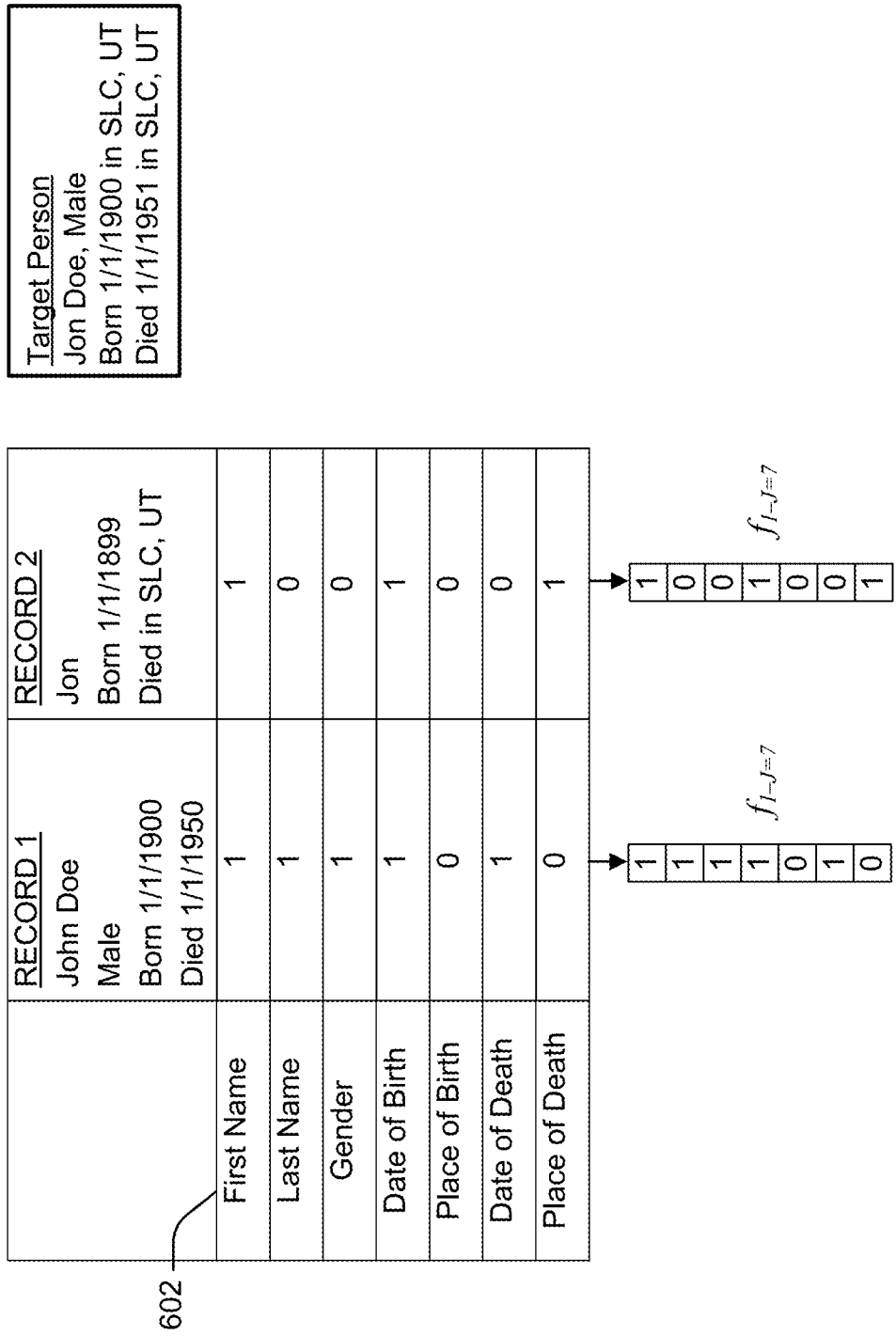
FIG. 6 illustrates an example of generating feature vectors for two records.

FIG. 6 illustrates an example of generating feature vectors $f_{1-J}$ for two records ("Record 1" and "Record 2"). The records are analyzed (either by a user or by record feature generator 312) for the presence of the different features shown in column 602. In the illustrated example, feature values only indicate the presence of the feature in the record (1 if present and 0 if missing), and not the similarity between the feature and the target person. For example, even though Record 1 includes the misspelled first name "John" instead of the true spelling "Jon", the feature value is set to 1 since that particular feature is present in Record 1. In some embodiments, the feature value may further indicate a similarity between the feature and the target person (e.g., "John" may correspond to a feature value of 0.8 and "Jon" may correspond to a feature value of 1).

Figure 7:
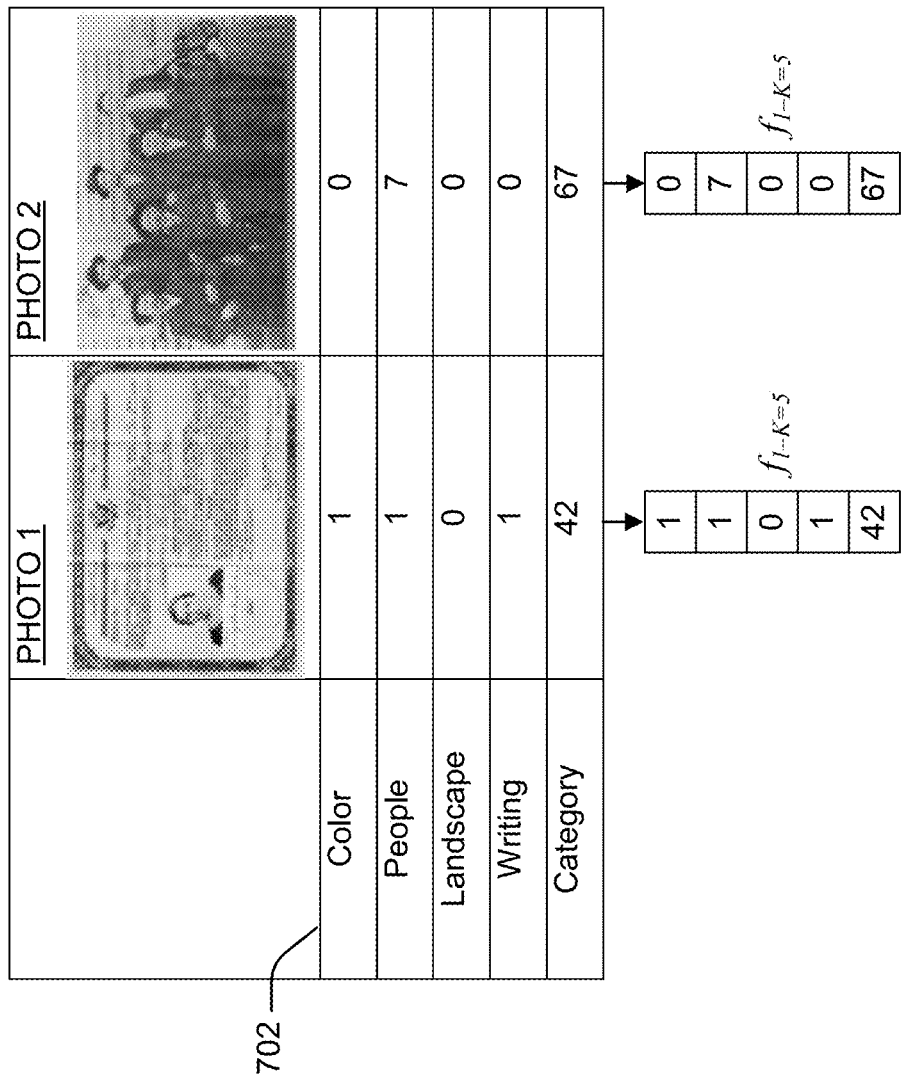
FIG. 7 illustrates an example of generating feature vectors for two photos.

FIG. 7 illustrates an example of generating feature vectors $f_{1-K}$ for two photos ("Photo 1" and "Photo 2"). The photos are analyzed (either by a user or by photo feature generator 314) for the presence (or for some other aspect) of the different features shown in column 702. In the illustrated example, feature values either indicate the presence of the feature in the photo (e.g., color, landscape, writing) or a classification with regards to a category (e.g., number of people, category). For example, Photo 1 includes color, a single person, no landscape, writing, and is assigned to category 42, which may be a category for immigration documents. As another example, Photo 2 includes no color, 7 people, no landscape, no writing, and is assigned to category 67, which may be a category for images of groups of people. In some embodiments, the feature value may indicate a confidence in a classification. For example, a photo with lots of color may correspond to a feature value of 1 and a photo with little color may correspond to a feature value of 0.3.

Figure 8:
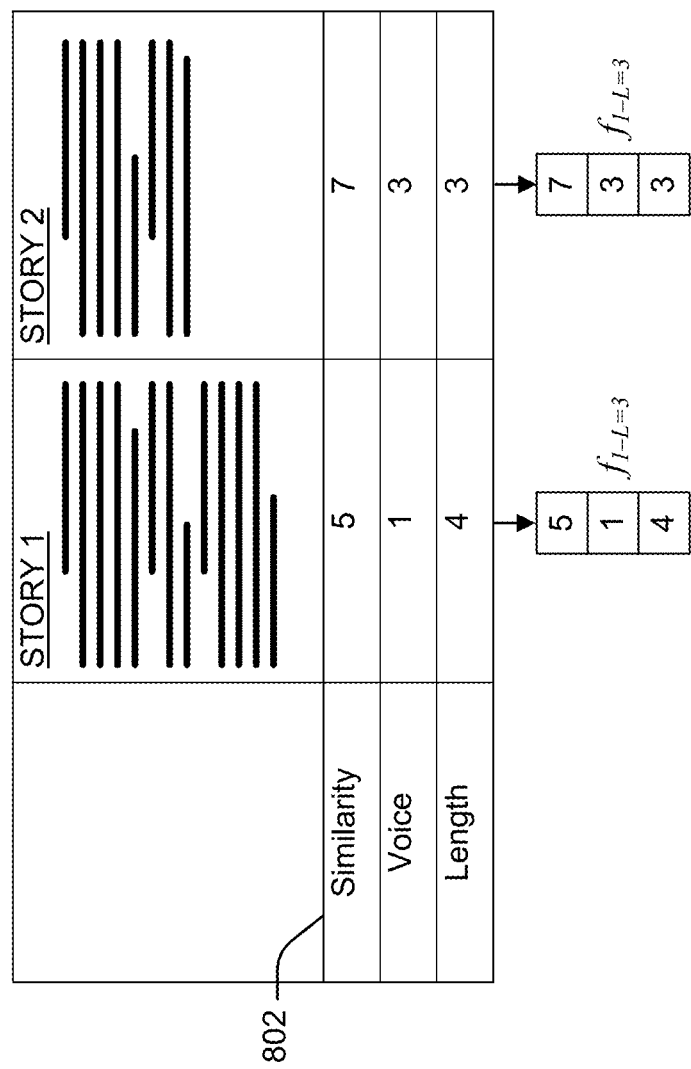
FIG. 8 illustrates an example of generating feature vectors for two stories.

FIG. 8 illustrates an example of generating feature vectors $f_{1-L}$ for two stories ("Story 1" and "Story 2"). The stories are analyzed (either by a user or by story feature generator 316) for the presence (or for some other aspect) of the different features shown in column 802. In the illustrated example, the first feature indicates the similarity between the story and the target person (e.g., similar names, locations, etc.), the second feature indicates the voice in which the story is written (e.g., first person, third person, etc.), and the third feature indicates the length of the story. For example, as shown by the feature values, although Story 1 is longer than Story 2, Story 1 has less similarity to the target person than Story 2.

Figure 9:
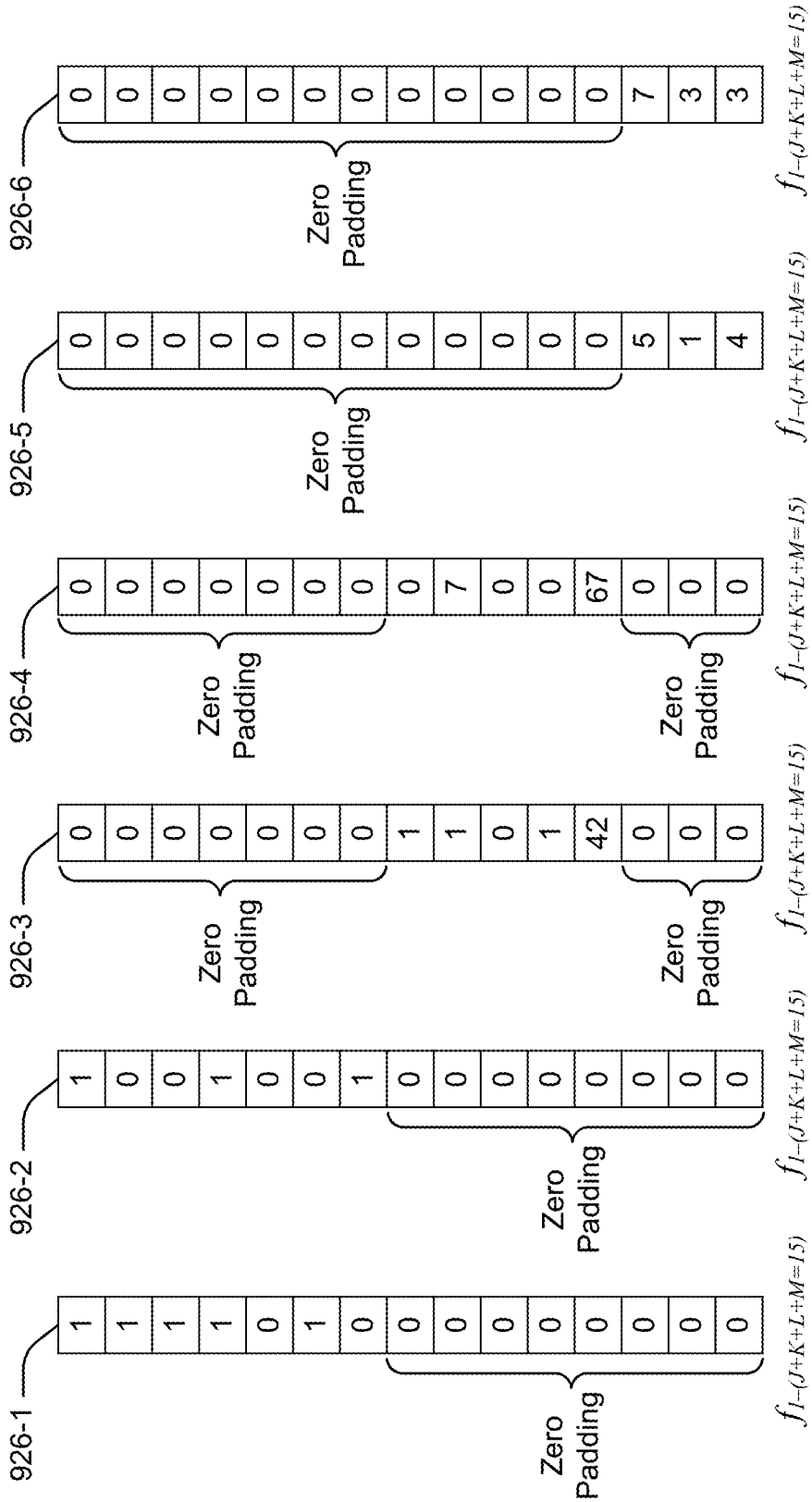
FIG. 9 illustrates an example of generating extended feature vectors from feature vectors.

FIG. 9 illustrates an example of generating extended feature vectors 926 from the feature vectors described in reference to FIGS. 6-8. In the illustrated example, the extended feature vectors are generated by extending the feature vectors through zero padding to one or both ends of the feature vectors. For example, extended feature vectors 926-1, 926-2 are generated by adding 8 feature values to the ends of the record feature vectors described in reference to FIG. 6, extended feature vectors 926-3, 926-4 are generated by adding 7 feature values to the beginnings and 3 feature values to the ends of the photo feature vectors described in reference to FIG. 7, and extended feature vectors 926-5, 926-6 are generated by adding 12 feature values to the beginnings of the story feature vectors described in reference to FIG. 8.

Figure 10:
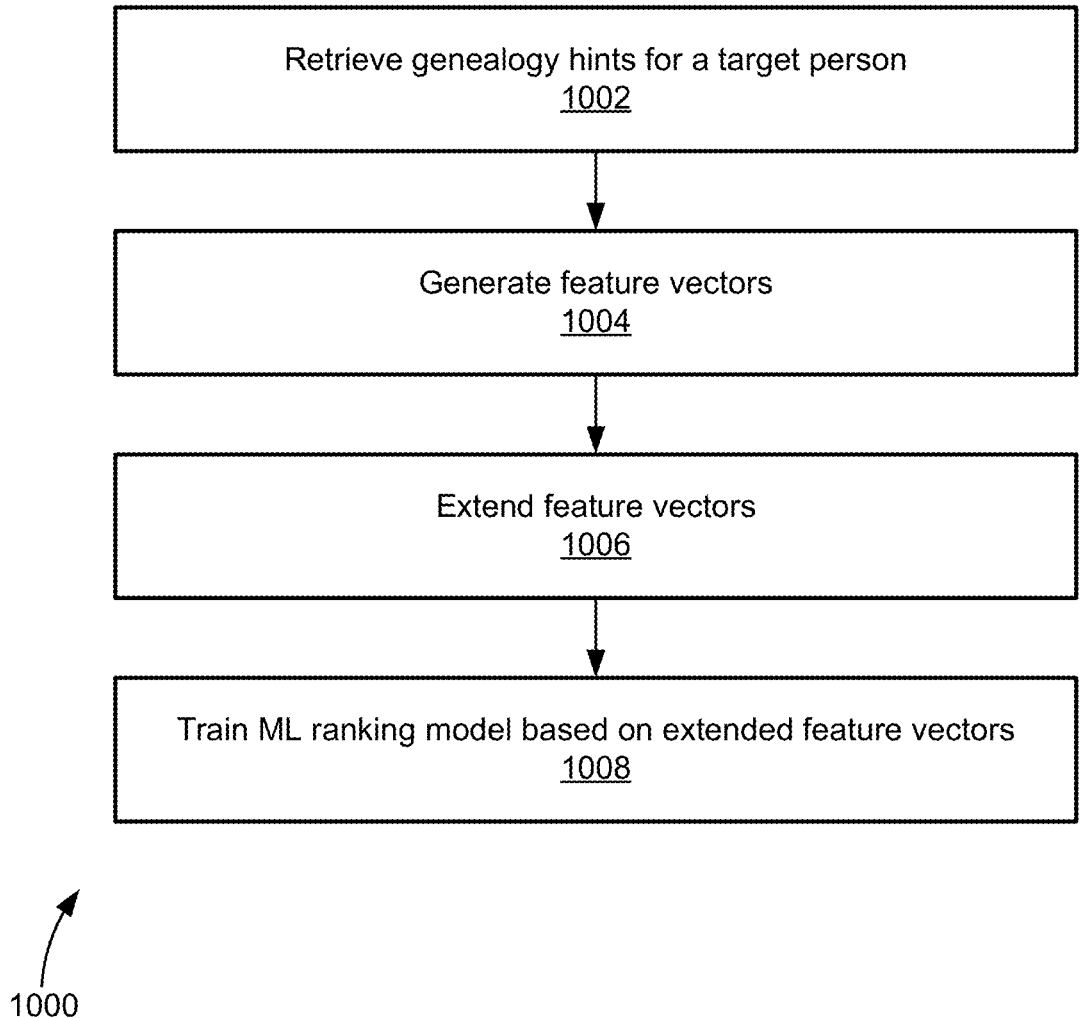
FIG. 10 illustrates a method of training a machine learning ranking model, according to some embodiments of the present invention.

FIG. 10 illustrates a method 1000 of training a ML ranking model, such as ML ranking model 330, according to some embodiments of the present invention. One or more steps of method 1000 may be performed in an order different than that shown in FIG. 10, and one or more steps of method 1000 may be omitted during performance of method 1000. In some embodiments, the ML ranking model is a neural network.

At step 1002, a plurality of genealogy hints for a target person are retrieved. Each of the plurality of genealogy hints may have a hint type and may correspond to a genealogy item, such as a record, photo, or story. Each of a plurality of hint types may have a predetermined number of features.

At step 1004, a feature vector is generated for each of the plurality of genealogy hints. Each of the feature vectors may have a plurality of feature values. The feature vectors may collectively be referred to as a plurality of feature vectors.

At step 1006, each of the plurality of feature vectors are extended by at least one additional feature value based on the number of features of the other hint types of the plurality of hint types.

At step 1008, the ML ranking model is trained based on the extended feature vectors. In some embodiments, the ML ranking model is also trained based on user-provided labels. The ML ranking model may rank one or more genealogy hints based on the extended feature vectors, and the ranked hints may be compared to user-provided labels to generated an error. The ML ranking model is then modified based on the error so that the error is reduced in subsequent iterations of training.

In some embodiments, the ML ranking model is trained over two stages during each training iteration. During a first stage, a first training set is created based on the plurality of extended feature vectors. For example, the first training set may include the plurality of extended feature vectors. Further during the first stage, the ML ranking model is provided with the plurality of extended feature vectors so as to generate ranked hints. During a second stage, a second training set is created including one or more of the ranked hints that were ranked incorrectly. The incorrectly ranked hints are obtained by comparing the ranked hints to user-provided labels and determining differences between the two. Further during the second stage, the incorrectly ranked hints may be used to modify (i.e., train) the ML ranking model so that the error is reduced in subsequent iterations of training.

Figure 11:
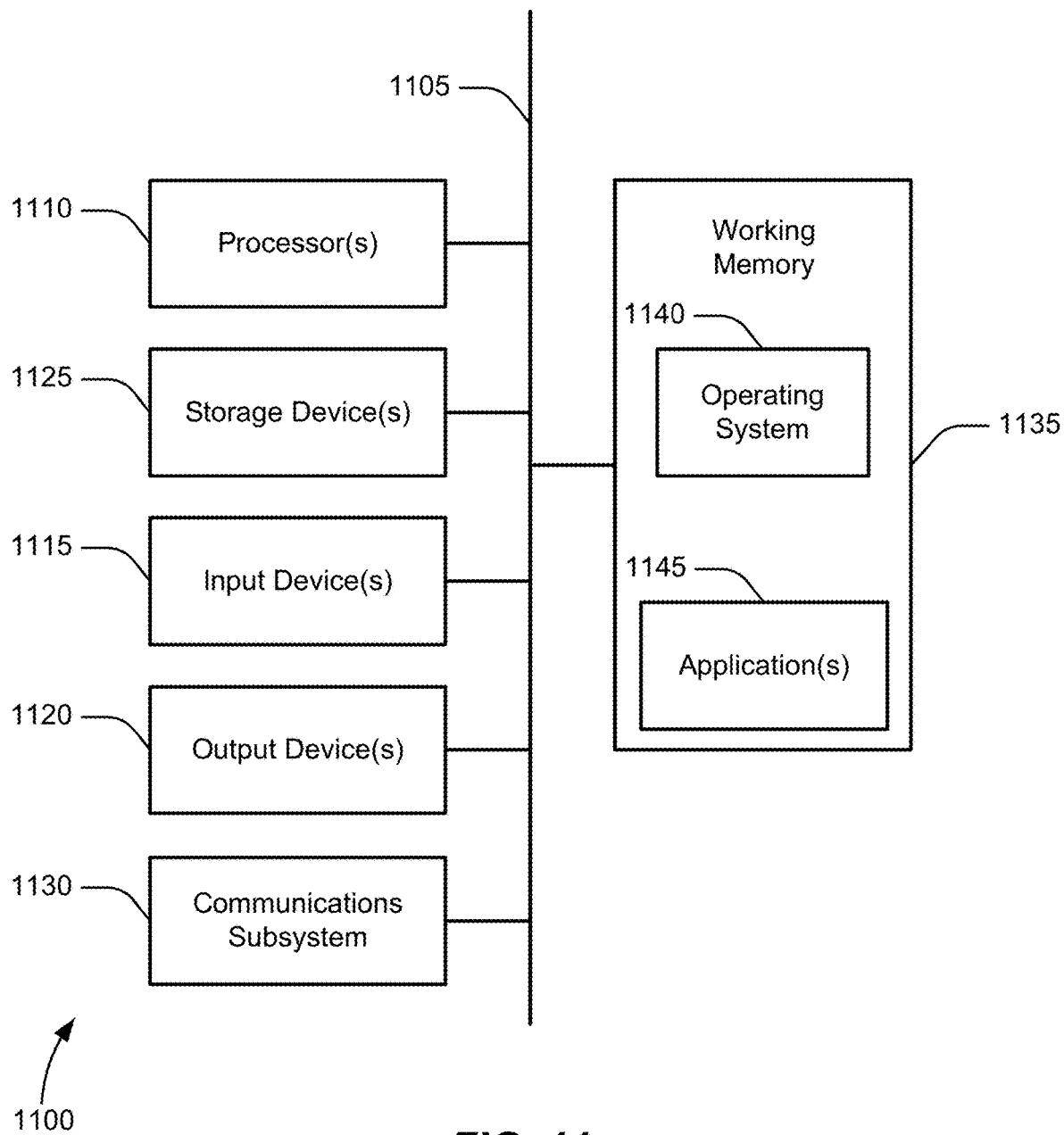
FIG. 11 shows a simplified computer system, according to some embodiments of the present invention.

FIG. 11 shows a simplified computer system 1100, according to some embodiments of the present invention. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include without limitation a mouse, a keyboard, a camera, and/or the like; and one or more output devices 1120, which can include without limitation a display device, a printer, and/or the like.

The computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device, e.g. the first electronic device, may be incorporated into the computer system 1100, e.g., an electronic device as an input device 1115. In some embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 11, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of training a machine learning (ML) genealogical hint-ranking model to rank genealogy hints, the method comprising:
   retrieving a plurality of genealogy hints for a target person, wherein each of the plurality of genealogy hints corresponds to a genealogy item and has a hint type of a plurality of hint types, wherein each of the plurality of hint types has a number of features;
   generating, for each of the plurality of genealogy hints, a feature vector having a plurality of feature values, the feature vector being included in a plurality of feature vectors;
   extending each of the plurality of feature vectors by at least one additional value based on the number of features of one or more other hint types of the plurality of hint types;
   creating a first training set based on the plurality of feature vectors;
   receiving a user input providing a ranking label;
   training the ML genealogical hint-ranking model in a first stage using the first training set and the ranking label;
   creating a second training set including a subset of the plurality of genealogy hints that were incorrectly ranked after the first stage; and
   training the genealogical hint-ranking ML genealogical hint-ranking model in a second stage using the second training set.

2. The method of claim 1, wherein the ML ranking model is a neural network.

3. The method of claim 1, wherein the plurality of hint types includes one or more of:
   a record hint type;
   a photo hint type; or
   a story hint type.

4. The method of claim 1, wherein the number of the plurality of feature values in the feature vector generated for each of the plurality of genealogy hints is equal to the number of features for the hint type.

5. The method of claim 1, wherein each of the plurality of feature vectors are extended through zero padding.

6. The method of claim 1, further comprising:
   receiving a user input indicating the target person; or
   receiving a user input indicating a plurality of target persons including the target person.

7. The method of claim 1, further comprising:
   receiving a user input providing a ranking label, wherein the second training set is created based on the user-provided ranking label.

8. A non-transitory computer-readable medium comprising instructions that, when executed by one or more processors, cause the one or more processors to perform operations comprising:
   retrieving a plurality of genealogy hints for a target person, wherein each of the plurality of genealogy hints corresponds to a genealogy item and has a hint type of a plurality of hint types, wherein each of the plurality of hint types has a number of features;
   generating, for each of the plurality of genealogy hints, a feature vector having a plurality of feature values, the feature vector being included in a plurality of feature vectors;
   extending each of the plurality of feature vectors by at least one additional value based on the number of features of one or more other hint types of the plurality of hint types;

creating a first training set based on the plurality of feature vectors;

receiving a user input providing a ranking label;

training a machine learning (ML) genealogical hint-ranking model in a first stage using the first training set and the ranking label;

creating a second training set including a subset of the plurality of genealogy hints that were incorrectly ranked after the first stage; and training the ML genealogical hint-ranking model in a second stage using the second training set.

9. The non-transitory computer-readable medium of claim 8, wherein the ML ranking model is a neural network.

10. The non-transitory computer-readable medium of claim 8, wherein the plurality of hint types includes one or more of:
a record hint type;
a photo hint type; or
a story hint type.

11. The non-transitory computer-readable medium of claim 8, wherein the number of the plurality of feature values in the feature vector generated for each of the plurality of genealogy hints is equal to the number of features for the hint type.

12. The non-transitory computer-readable medium of claim 8, wherein each of the plurality of feature vectors are extended through zero padding.

13. The non-transitory computer-readable medium of claim 8, further comprising:
receiving a user input indicating the target person; or
receiving a user input indicating a plurality of target persons including the target person.

14. The non-transitory computer-readable medium of claim 8, wherein the operations further comprise:
receiving a user input providing a ranking label, wherein the second training set is created based on the user-provided ranking label.

15. A system comprising:
one or more processors; and
a non-transitory computer-readable medium comprising instructions that, when executed by the one or more processors, cause the one or more processors to perform operations comprising:
retrieving a plurality of genealogy hints for a target person, wherein each of the plurality of genealogy hints corresponds to a genealogy item and has a hint type of a plurality of hint types, wherein each of the plurality of hint types has a number of features;

generating, for each of the plurality of genealogy hints, a feature vector having a plurality of feature values, the feature vector being included in a plurality of feature vectors;

extending each of the plurality of feature vectors by at least one additional value based on the number of features of one or more other hint types of the plurality of hint types;

creating a first training set based on the plurality of feature vectors;

receiving a user input providing a ranking label;

training a machine learning (ML) genealogical hint-ranking model in a first stage using the first training set and the ranking label;

creating a second training set including a subset of the plurality of genealogy hints that were incorrectly ranked after the first stage; and training the ML genealogical hint-ranking model in a second stage using the second training set.

16. The system of claim 15, wherein the number of the plurality of feature values in the feature vector generated for each of the plurality of genealogy hints is equal to the number of features for the hint type.

17. The system of claim 15, wherein each of the plurality of feature vectors are extended through zero padding.

18. The system of claim 15, further comprising at least one of a record feature generator, a photo feature generator, and a story feature generator.

19. The system of claim 18, wherein each of the record, photo, and story feature generators comprises a neural network.

20. The system of claim 18, wherein each of the record, photo, and story feature generators is trained by comparing the plurality of feature vectors against a user-provided record label, photo label, and story label, respectively.

* * * * *